H. Brown,
Making Staves.
N° 20,696. Patented June 29, 1858.
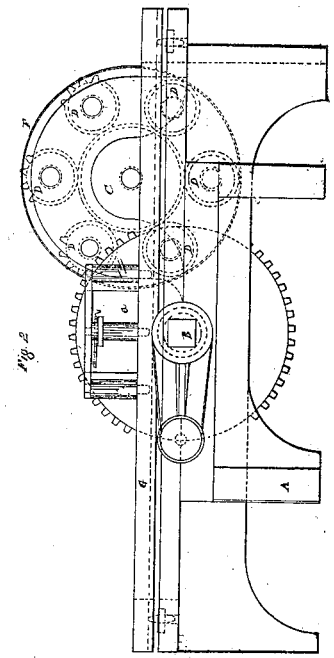
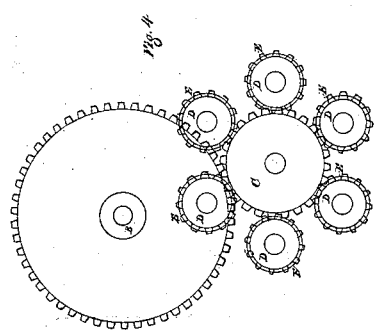
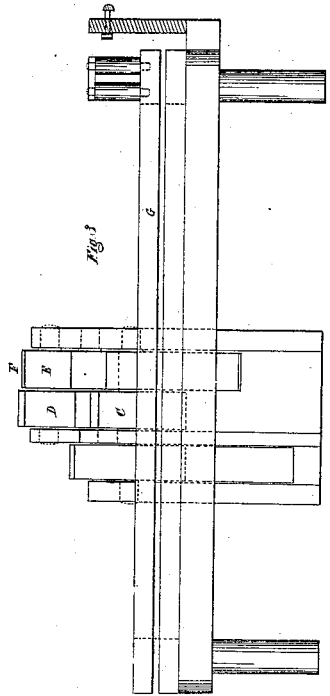
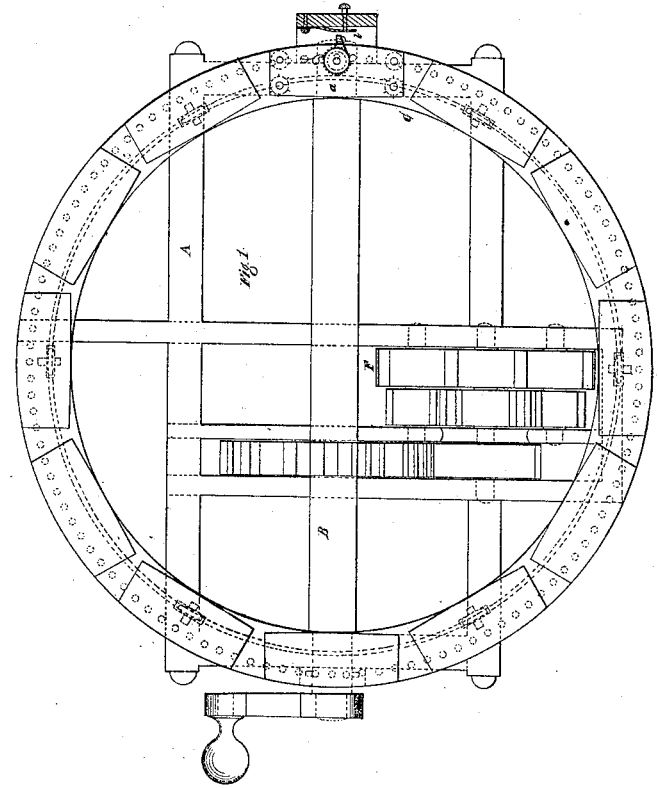

UNITED STATES PATENT OFFICE.

HARVEY BROWN, OF NEW YORK, N. Y.

ROTARY SAWING-MACHINE.

Specification of Letters Patent No. 20,696, dated June 29, 1858.

*To all whom it may concern:*

Be it known that I, HARVEY BROWN, of the city, county, and State of New York, have invented a new and useful Machine for Sawing Out Staves, Fellies, and other Similar Formed Pieces of Timber; and I do hereby declare that the following is a full, clear, and exact description of the construction and operation of the same, reference being had to the annexed drawings, making a part of this specification, in which—

Figure 1, is a plan of the machine; Fig. 2, a longitudinal elevation Fig. 3, a transverse sectional view; Fig. 4, a detached view of the wheels and gearing.

A, the frame of the machine; B, the main driving wheel and shaft; C, the second or receiving wheel having a second or pinion driving wheel mounted upon the same shaft; D, D, D, D, D, D, the pinions having pulleys or friction rollers, E, mounted or attached to their several shafts; F, the saw; G, the circular carriage.

To enable others skilled in the art to make and use my invention, I will proceed to describe its construction and operation.

I make a frame, A, in any convenient and suitable form, to which I attach the main driving shaft and wheel, B, which may be a cog wheel as in the drawing, or a pulley, cone or otherwise, for the purpose of driving the second shaft with its gearing and saw attached by which means the relative motion of the saw and carriage may be varied as desired when run by a band, and thus connecting the main driving wheel, B, with the receiving wheel, C, having the second or pinion driving wheel attached; around this driving wheel I attach the pinions at equal spaced distances, six in the drawing marked, D, D, D, D, D, D; any number desired may be inserted; upon the pulleys, E, attached to the shafts of these pinions I place the saw, F, the diameter of which must be just equal to the radius of the pulleys, and for the purpose of propelling the saw in its work, there may be pins or cogs upon the margin of the pulleys so arranged and placed as that they shall meet notches made in the margins of the saw, or the pins or cogs may be placed in the center of the pulleys to meet holes made in the saw at suitable distances in which the pins may enter as they rotate, or there may be set screws or other appliances by which the radius of the pulleys may be enlarged and thereby so impinge upon the saw as that it shall be impelled in its work. The saw must be made a true circle accurate and staunch and in its course run vertical or transverse to the circular carriage, G, which runs horizontally upon fixed ways having friction rollers which move in a groove in the under side of the carriage which carriage is propelled by pins or cogs in the main shaft which mesh into holes or cogs in the under side of the carriage. The diameter of the inner circle of the carriage must be just equal to the longitudinal curve of the staves or timber to be sawed and consequently more or less blocks can be placed on the carriage according to the curve; in the model twelve blocks are designed as shown by the black spots on the carriage; these blocks are prepared in a saw mill by sawing the timber in cants of the thickness intended for the width of the staves, and then sawed off in blocks suitable for the length of the staves; these blocks are placed in a frame, a, on the carriage, which frame has vertical spurred rollers that hold the blocks and by means of the cords or chains attached to the rollers and the rotating shaft having a ratchet wheel and pawl and as the carriage rotates this pawl is brought in contact with the adjustable projection, b, by which means the block is moved up the desired thickness of the stave; I do not however claim this device for setting the block as I have it already in a patent granted to me for a sawing machine dated November 10th 1857. In arranging the carriage in reference to the saw it should be so placed that the plane of the saw shall be at the center of the block to be sawed.

What I claim as my invention and desire to secure by Letters Patent is—

The arrangement of a hoop or band saw operating vertically within a circular horizontal carriage with adjustable feed motion by which there is a continuous rotary motion of both saw and carriage all operating in unison with reference to the desired end, when in motion, substantially in the manner and for the purposes set forth.

HARVEY BROWN.

Witnesses:
E. H. BROWN,
NELSON BARLOW.